United States Patent
Grandhee

(10) Patent No.: US 6,927,271 B2
(45) Date of Patent: Aug. 9, 2005

(54) HYDROXYL AND CARBAMATE FUNCTIONAL RESINS

(75) Inventor: Sunitha Grandhee, Novi, MI (US)

(73) Assignee: BASF Corporation, Southfield, MI (US)

( * ) Notice: Subject to any disclaimer, the term of this patent is extended or adjusted under 35 U.S.C. 154(b) by 261 days.

(21) Appl. No.: 10/043,816

(22) Filed: Jan. 10, 2002

(65) Prior Publication Data

US 2003/0130471 A1 Jul. 10, 2003

(51) Int. Cl.$^7$ ............................................. C08G 18/80
(52) U.S. Cl. ...................... 528/45; 528/85; 528/264; 525/456; 525/457; 252/182.26; 564/50; 564/51; 564/55; 564/59; 564/60
(58) Field of Search ....................... 252/182.26; 528/45, 528/85, 264; 525/456, 457; 564/50, 51, 55, 59, 60

(56) References Cited

U.S. PATENT DOCUMENTS

| | | |
|---|---|---|
| 2,979,514 A | 4/1961 | O'Brien ................... 260/340.2 |
| 3,479,328 A | 11/1969 | Nordstrom et al. ......... 260/86.1 |
| 3,505,297 A | 4/1970 | Sheetz ........................ 260/78.4 |
| 3,674,838 A | 7/1972 | Nordstrom ................... 260/482 |
| 4,126,747 A | 11/1978 | Cowherd et al. ............ 520/166 |
| 4,279,833 A | 7/1981 | Culbertson et al. ......... 260/464 |
| 4,301,257 A | 11/1981 | Zengel et al. ................ 525/329 |
| 4,340,497 A | 7/1982 | Knopf ...................... 252/188.3 |
| 4,477,624 A | 10/1984 | Waki ........................... 524/736 |
| 4,522,986 A * | 6/1985 | Short et al. .................. 525/458 |
| 4,758,632 A | 7/1988 | Parekh et al. ............... 525/383 |
| 4,791,168 A | 12/1988 | Salatin et al. ............... 524/601 |
| 4,801,623 A | 1/1989 | Hess et al. ................... 521/157 |
| 4,820,830 A | 4/1989 | Blank .......................... 560/158 |
| 4,868,298 A | 9/1989 | Brinkman .................... 540/525 |
| 4,959,277 A * | 9/1990 | Saeki et al. .................. 428/623 |
| 5,223,600 A * | 6/1993 | Keppeler et al. ............. 528/71 |
| 5,326,815 A | 7/1994 | Serdiuk et al. .............. 524/591 |
| 5,336,566 A | 8/1994 | Rehfuss ....................... 428/524 |
| 5,356,669 A | 10/1994 | Rehfuss et al. ........... 427/407.1 |
| 5,373,069 A | 12/1994 | Rehfuss et al. .............. 525/456 |
| 5,418,301 A | 5/1995 | Hult et al. ................... 525/437 |
| 5,563,208 A | 10/1996 | König et al. ................. 524/591 |
| 5,580,922 A | 12/1996 | Park et al. ................... 524/733 |
| 5,663,247 A | 9/1997 | Sörensen et al. ........... 525/533 |
| 5,693,723 A | 12/1997 | Green ......................... 525/481 |
| 5,693,724 A | 12/1997 | Green ......................... 525/481 |
| 5,792,810 A | 8/1998 | Menovcik et al. .......... 524/590 |
| 5,834,118 A | 11/1998 | Rånby et al. ................ 428/482 |
| 5,852,162 A | 12/1998 | Smith et al. ................. 528/272 |
| 5,869,191 A | 2/1999 | Clemons Van Gaalen et al. ........................... 428/842 |
| 5,945,499 A | 8/1999 | Ohrborn et al. .............. 528/75 |
| 5,976,615 A | 11/1999 | Menovcik et al. .......... 427/140 |
| 6,103,387 A | 8/2000 | Yamamoto et al. ......... 428/482 |
| 6,462,144 B1 | 10/2002 | Ramesh |
| 6,569,956 B1 | 5/2003 | Ramesh |
| 2003/0114584 A1 | 6/2003 | Grandhee |

FOREIGN PATENT DOCUMENTS

| | | | |
|---|---|---|---|
| EP | WO93/17060 | 9/1993 | ........... C08G/63/02 |
| EP | WO94/10211 | 5/1994 | ............. C08F/8/30 |
| EP | WO97/45474 | 12/1997 | ........... C08G/81/00 |
| EP | 1 167 413 | 6/2001 | |
| WO | WO 01/34674 | 3/2001 | |

OTHER PUBLICATIONS

XP 000646275 Bo Pettersson, entitled "High–solid alkyds–based on hyperbranched (dendritic) polymers– a new concept with new opportunities" dated Feb. 9–11, 1994, pp. 753–764.

English Language International Search Report for PCT/EP02/32976; Jan. 2003.

Bo Pattersson, Perstorp Polyols– Application Technology, S–284 80 Perstorp SWEDEN, entitled Hyperbranched polymers– unique design tools for multi property control in resin and coatings, pp. 1–19, and Generations 2–4; 1995.

Young H. Kim, DuPont CR&D, Experimental Station, E328/261, Wilmington, Delaware 19808, Apr. 13, 1998 pp. 1685–1698.

M. Trollsås et al., entitled Highly functional branched and dendri–graft aliphatic polyesters through ring opening polymerization, vol. 31, no. 9, 1998, pp. 2756–2763.

* cited by examiner

Primary Examiner—Rachel Gorr

(57) ABSTRACT

Coating compositions contain hydroxyl- or carbamate functional resins with a relatively low equivalent weight. The resins are based on a polyol core containing urea and hydroxyl groups, and made by reacting a polyisocyanate, preferably a triisocyanate, with an amino functional polyol, preferably a polyol having one amino group and two or more hydroxyl groups. The polyol core may be further extended to a first or higher generation dendrimer or hyperbranched structure by reacting the initial polyol core with a compound having one carboxyl group and two or more hydroxyl groups.

33 Claims, No Drawings

US 6,927,271 B2

HYDROXYL AND CARBAMATE FUNCTIONAL RESINS

FIELD OF THE INVENTION

The invention relates to resins for organic coatings that have hydroxyl or carbamate functionality. More specifically it relates to coating compositions containing the hydroxyl or carbamate functional resins and other resins with functional groups reactive with the hydroxyl and carbamate groups.

BACKGROUND OF THE INVENTION

Curable, or thermosettable, coating compositions are widely used in the coatings art, particularly for topcoats in the automotive and industrial coatings industry. Basecoat-clearcoat composite coatings are topcoats that offer exceptional gloss, depth of color, distinctness of image, or special metallic effects. The automotive industry has made extensive use of basecoat-clearcoat composite coatings for automotive body panels. Single layer topcoats and the clearcoats of color plus clear composite coatings usually require an extremely high degree of clarity and gloss to achieve the desired visual effect. Furthermore, they must maintain the clarity and gloss over long periods of time in the fact of environmental challenges.

Clearcoat coating compositions used as the outermost automotive coating are subject to damage caused by numerous elements. These elements include environmental fall out, exposure to ultraviolet radiation from sunlight, exposure to high relative humidity at high temperature, and defects made by impacts of small, hard objects resulting in chipping. "Environmental etch" is a term applied to a kind of exposure degradation that is characterized by spots or marks on or in the finish on the coating that often cannot be rubbed out.

Resins for coating compositions are selected by the formulator to provide desirable properties associated with the structure of the resin. Because most resins require curing before development of optimum coating properties, it is usually necessary for the formulator to add a crosslinking agent or resin to the coating composition. The crosslinking resin, in general, contains reactive functional groups that react with the functional groups of the coating resin. In many cases, it is advantageous to provide crosslinking resins that are compatible with the coating resin and that have as high a functionality as possible. Such crosslinkers can be used in relatively small amounts without detracting from the coating properties of the composition.

Coating compositions based on carbamate-functional resins and aminoplast cross-linking agents are desirable as automotive topcoats because they have excellent durability, hardness, gloss, appearance, and resistance to environmental etch. As such, they are highly suitable for use as a clearcoat layer applied over a basecoat layer in a color plus clear composite coating. Especially for hardness and etch, it is desirable to provide coating compositions with a suitable level of crosslinkable sites. Futhermore, molecules having hydroxyl functionality are generally helpful in promoting intercoat adhesion.

It would be desirable to improve the crosslinking density of such compositions by adding a resin having hydroxyl or carbamate functionality and a relatively low equivalent weight. It would be further desirable to provide such a crosslinking resin by reaction of a hydroxyl functional amine with an isocyanate under mild reaction conditions. This invention provides such a solution.

SUMMARY OF THE INVENTION

Coating compositions contain hydroxyl- or carbamate functional resins with a relatively low equivalent weight. The resins are based on a polyol core containing urea and hydroxyl groups, and made by reacting a polyisocyanate, preferably a triisocyanate, with an amino functional polyol, preferably a polyol having one amino group and two or more hydroxyl groups. The polyol core may be further extended to a first or higher generation dendrimer or hyperbranched structure by reacting the initial polyol core with a compound having one carboxyl group and two or more hydroxyl groups.

In one aspect, the hydroxyl functional polyol core is used as an additive or a resin in coating compositions, in combination with at least a second component containing functional groups reactive with the hydroxyl groups. In another aspect, the polyol cores are carbamoylated by one of a number of processes to yield carbamate functional resins. Coating compositions are provided containing the carbamate functional resins and at least a second component containing functional groups that are reactive with the carbamate functional groups of the resin.

DETAILED DESCRIPTION OF THE INVENTION

In one embodiment, the invention provides a coating composition containing a hydroxyl functional component and a component having a plurality of functional groups reactive with the hydroxyl groups on the hydroxyl functional component. The hydroxyl functional component of the invention is a reaction product of a polyisocyanate having two or more isocyanate groups and a reactive compound having two or more hydroxyl groups and one amino group. Preferably, the reactive compound has three hydroxyl groups. In a preferred embodiment, the polyisocyanate contains three or more isocyanate groups. When a triisocyanate is reacted with a reactive compound having three hydroxyl groups, the reaction product contains three internal urea linkages and nine hydroxyl groups.

The polyisocyanate compound used to make the hydroxy functional component or resin of the invention may be any organic isocyanate containing two or more isocyanate groups. For example, a number of diisocyanate compounds are known, many of which are commercially available. Diisocyanate compounds useful for making the carboxy resin of the invention include, without limitation, 1,11-diisocyanatoundecane, 1,12-diisocyanatododecane, 2,2,4- and 2,4,4-trimethyl-1,6-diisocyanatohexane, 1,3-diisocyanatocyclobutane, 4,4'-bis-(isocyanatocyclohexyl)-methane, hexamethylene diisocyanate, 1,2-bis-(isocyanatomethyl)-cyclobutane, 1,3- and 1,4-bis-(isocyanatomethyl)cyclohexane, hexahydro-2,4-and/or-2,6-diisocyanatoluene, 1-isocyanato-2-isocyanatomethyl cyclopentane, 1-isocyanato-3-isocyanatomethyl-3,5,5-trimethyl-cyclohexane, 2,4'-dicyclohexylmethane diisocyanate, and 1-isocyanato-4(3)-isocyanatomethyl-1-methyl cyclohexane.

Other suitable diisocyanates include aromatic diisocyanates, such as, without limitation, tetramethyl-1,3- and/or -1,4-xylylene diisocyanate, 1,3- and/or 1,4-phenylene diisocyanate, 2,4- and/or 2,6-toluene diisocyanate, 2,4- and/or 4,4'-diphenyl-methane diisocyanate, 1,5-diisocyanatonaphthalene, and p-xylylene diisocyanate. Mixtures of the above diisocyanates may also be used, as may mixtures of diisocyanates with the triisocyanates described below.

Suitable diisocyanates are also understood to include those containing modification groups such as biuret, uretdione, isocyanurate, allophanate and/or carbodiimide groups, as long as they contain two or more isocyanate groups.

In a preferred embodiment, the polyisocyanate compound contains three isocyanate groups. A convenient source of triisocyanate functional compounds is the known isocyanurate derivative of diisocyanates. Isocyanurate derivatives of diisocyanates can be made by reacting the diisocyanate together with a suitable trimerization catalyst. An isocyanurate derivative is produced that contains an isocyanurate core with pendant organic chains terminated by three isocyanate groups. Several isocyanurate derivatives of diisocyanates are commercially available. In one preferred embodiment, the isocyanurate used is the isocyanurate of isophorone diisocyanate. In another preferred embodiment, the isocyanaurate of hexamethylene diisocyanate is used.

The reactive compound contains one amino group that is either primary or secondary. It further contains at least two hydroxyl groups, preferably primary hydroxyl groups. In a preferred embodiment, the reactive compound contains one primary amino and three primary hydroxyl groups. In a preferred embodiment, the reactive compound comprises trimethylolaminomethane.

The hydroxyl functional components of the invention may be made under mild conditions by combining the polyisocyanate compound with the reactive compound, preferably without a catalyst. It is known that amino groups react much faster than hydroxyl groups with isocyanates. The methods of synthesis of the invention take advantage of this differential in reaction kinetics to form relatively clean reaction products. By carefully choosing the reaction conditions, unwanted polymerization or prepolymer formation between hydroxyl group and isocyanate group can be avoided. For example, if stoichiometric equivalent amounts of polyisocyanate and amino polyol reactive compound are combined, the predominant linkage formed will be urea groups resulting from the kinetically favored reaction of the isocyanate with the amine. Alternatively, in a preferred embodiment, the polyisocyanate compound may be added dropwise into the reactive compound containing both amino groups and hydroxyl groups. Again, because the reaction of amine with isocyanate is much faster than that of hydroxyl, the predominant linkage formed in the reaction product will be ureas.

In a preferred embodiment, a triisocyanate compound is reacted with a trihydroxyl amino compound to yield a nine functional hydroxyl resin. In a particularly preferred embodiment, an isocyanurate of an organic diisocyanate is reacted with trimethylolaminomethane to form the hydroxyl functional components of the invention.

The coating composition further comprises at least a second component having functional groups that are reactive with hydroxyl groups on the hydroxyl functional component. Such groups include alkylol and alkoxyalkyl groups on aminoplasts, isocyanate groups, blocked isocyanate groups, anhydride groups, and epoxy groups.

Aminoplasts are obtained from the reaction of formaldehyde with an amine or amide. The most common amines are melamine, urea, or benzoguanamine, and are preferred. However, condensates with other amines can be used; for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast contains alkylol groups and preferably at least a portion of these groups are etherified with an alcohol to modify the cure response. Any monohydric alcohol may be employed for this purpose including methanol, ethanol, butanol, isobutanol, and hexanol.

Preferably, the aminoplasts which are used are melamine-, urea-, or benzoguanamine-formaldehyde condensates etherified with an alcohol containing from one to four carbon atoms.

Other crosslinking agents suitable as the second component of the coating compositions include polyisocyanates. The polyisocyanate crosslinking agent may be a fully capped polyisocyanate with substantially no free isocyanate groups, or it may contain free isocyanate functionality. Free isocyanate groups allow for curing of the composition at temperatures as low as ambient. When the crosslinking agent contains free isocyanate groups, the coating composition is preferably a two-package composition (one package comprising the crosslinking agent and the other comprising the hydroxyl functional polymer) in order to maintain storage stability.

The polyisocyanate can be an aliphatic or an aromatic polyisocyanate or a mixture of the two. Diisocyanates are preferred, although higher polyisocyanates can be used in place of or in combination with diisocyanates.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4',4"-triisocyanate, 1,2,4-benzene triisocyanate and polymethylene polyphenyl isocyanate. Biurets and isocyanurates of diisocyanates, including mixtures thereof, such as the isocyanurate of hexamethylene diisocyanate, the biuret of hexamethylene diisocyanate and the isocyanurate of isophorone diisocyanate are also suitable.

Isocyanate prepolymers, for example, reaction products of polyisocyanates with polyols such as neopentyl glycol and trimethylolpropane or with polymeric polyols such as polycaprolactone diols and triols or polyalkylene oxides (NCO/OH equivalent ratio greater than one) can also be used.

Any suitable aliphatic, cycloaliphatic, or aromatic alkyl monoalcohol or phenolic compound may be used as a capping agent for the capped polyisocyanate crosslinking agent in the composition of the present invention including, for example, lower aliphatic alcohols such as methanol, ethanol, and n-butanol; cycloaliphatic alcohols such as cyclohexanol; aromatic-alkyl alcohols such as phenyl carbinol and methyphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, and amines such as dibutyl amine.

Epoxy resins may also be used as the second component, as can carboxyl terminated polyesters, carboxyl functional acrylic polymers, and polymers of anhydrides.

In another aspect, carbamate functional resins are prepared by adding carbamate groups to the hydroxyl functional components described above.

The terms "carbamate group", "carbamate-functional", and the like, as used in connection with the present invention refer to a group having a structure:

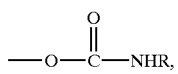

in which R is H or alkyl, preferably R is H or alkyl of from 1 to about 8 carbon atoms, more preferably R is H or alkyl of from 1 to about 4 carbon atoms, and yet more preferably R is H. When R is H, the carbamate group is referred to herein as a primary carbamate group.

Carbamate functional resins of the invention may be prepared from the hydroxyl functional components by a number of procedures. In one embodiment, the polyol core itself may be directly carbamoylated, either by a direct carbamation of transcarbamation reaction, or by reacting the hydroxyl functional component with a compound that contains both an isocyanate group (or other functional group that reacts with hydroxyl) and a carbamate group. In another embodiment, a carbamate group may be added onto the hydroxyl functional component by first chain extending the hydroxyl functional component in a step or series of steps to be described below, and then adding a carbamate group to the resulting hydroxyl functional intermediate, such as by the procedures mentioned above.

A carbamate group may be added to hydroxyl function component by reacting with a carbamate compound. In one embodiment, the carbamate compound is cyanic acid, which may be formed by the well-known reaction of the thermal decomposition of urea or by other methods, such as described in the U.S. Pat. Nos. 4,389,386 or 4,364,913. In another embodiment, the carbamate compound is a compound comprising a carbamate group. In this embodiment, the reaction between the hydroxyl functional component and the carbamate compound is believed to be a transesterification between the hydroxyl groups of the component and the carbamate ester on the carbamate compound. The carbamate compound can be any compound having a carbamate group capable of undergoing a transesterification with the hydroxyl groups on the second intermediate. These include, without limitation, methyl carbamate, butyl carbamate, propyl carbamate, 2-ethylhexyl carbamate, cyclohexyl carbamate, phenyl carbamate, hydroxypropyl carbamate, hydroxyethyl carbamate, and the like. Useful carbamate compounds can be characterized by the formula:

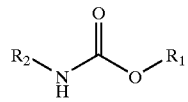

wherein $R_1$ is substituted or unsubstituted alkyl (preferably of 1–8 carbon atoms) and $R_2$ is H, substituted or unsubstituted alkyl (preferably of 1–8 carbon atoms, substituted or unsubstituted cycloalkyl (preferably of 6–10 carbon atoms), or substituted or unsubstituted aryl preferably of 6–10 carbon atoms). Preferably, $R_2$ is H.

The transesterification reaction between the hydroxyl component and the carbamate compound can be conducted under typical transesterification conditions, e.g., temperatures from room temperature to 150° C. with transesterification catalysts such as calcium octoate, metal hydroxides (e.g., KOH), Group I or II metals (e.g., Na, Li), or metal carbonates (e.g., $K_2CO_3$). These may be enhanced by use in combination with crown ethers, metal oxides (e.g., dibutyl-tin oxide), metal alkoxides (e.g., $NaOCH_3$, $Al(OC_3H_7)_3$), metal carboxylic acid salts (e.g., stannous octoate, calcium octoate), protic acids (e.g., $H_2SO_4$), $MgCO_3$, or $Ph_4SbI$. The reaction may also be conducted at room temperature with a polymer-supported catalyst such as Amberlyst-15® (Rohm & Haas) as described by R. Anand, *Synthetic Communications*, 24(19), 2743–47 (1994), the disclosure of which is incorporated herein by reference.

In another embodiment, the carbamate compound comprises a molecule with an isocyanate group and a carbamate group. Such a molecule can be prepared for example by reacting an organic diisocyanate with a difunctional compound that contains, in addition to a carbamate group, a reactive hydroxyl or amino group. The difunctional molecule can be, for example, a hydroxycarbamate that is the reaction product of ammonia or a primary amine with an alkylene carbonate, which is well known in the art.

Diisocyanates suitable for reaction with the difunctional compound to form the carbamate compound include aliphatic or cycloaliphatic diisocyanates, such as 1,11-diisocyanatoundecane, 1,12-diisocyanatododecane, 2,2,4- and 2,4,4-trimethyl-1,6-diisocyanatohexane, 1,3-diisocyanatocyclobutane, 4,4'-bis-(isocyanatocyclohexyl)-methane, hexamethylene diisocyanate (HMDI), 1,2-bis-(isocyanatomethyl)-cyclobutane, 1,3- and 1,4-bis-(isocyanatomethyl)cyclohexane, hexahydro-2,4- and/or -2,6-diisocyanatotoluene, 1-isocyanato-2-isocyanatomethyl cyclopentane, 1-isocyanato-3-isocyanatomethyl-3,5,5-trimethyl-cyclohexane, 2,4'-dicyclohexyl-methane diisocyanate, and 1-isocyanato-4(3)-isocyanatomethyl-1-methyl cyclo-hexane.

Other suitable diisocyanates include aromatic diisocyanates, such as, without limitation, tetramethyl-1,3- and/or -1,4-xylylene diisocyanate, 1,3- and/or 1,4-phenylene diisocyanate, 2,4- and/or 2,6-toluene diisocyanate, 2,4- and/or 4,4'-diphenyl-methane diisocyanate, 1,5-diisocyanato naphthalene, p-xylylene diisocyanate and mixtures thereof.

Suitable diisocyanates are also understood to include those containing modification groups such as biuret, uretdione, isocyanurate, allophanate and/or carbodiimide groups, as long as they contain two isocyanate groups.

The carbamate compound can be prepared by converting one of the isocyanate groups of the diisocyanate to a carbamate group by reacting the diisocyanate with the difunctional compound. To make it easier to convert just one isocyanate group, it is preferred to use a diisocyanate compound that has isocyanate groups of different reactivity. In this situation, one of the isocyanates will react preferentially with the difunctional compound.

Examples of diisocyanates having isocyanate groups of different reactivity include, without limitation, 1-isocyanato-3-isocyanatomethyl-3,5,5-trimethylcyclohexane (also known as isophorone diisocyanate), 1-isocyanato-2-isocyanatomethylcyclopentane, 1-isocyanato-1-methyl-4 (3)-isocyanatomethylcyclohexane, 2,3-toluenediisocyanate, and 2,4-toluenediisocyanate. In a preferred embodiment, isophorone diisocyanate is used.

The product of such a reaction is a compound with an isocyanate group and a carbamate group. As an illustration, when the diisocyanate is isophorone diisocyanate, and the difunctional molecule is a reaction product of ammonia and propylene carbonate, one isomer of the carbamate compound can be represented by the idealized structure

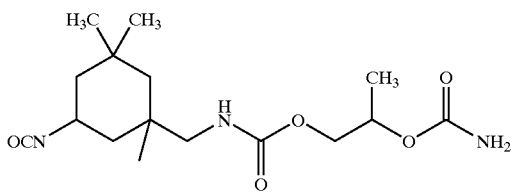

The idealized structure illustrates the preferential reaction of the difunctional compound with the primary isocyanate on isophorone diisocyanate. The actual product of such a reaction statistically will include some product substituted on the secondary isocyanate, as well as disubstitued diisocyanate and some unreacted diisocyanate. The product can then be reacted with the second intermediate to provide the resin of the invention.

Another way to add a carbamate group to hydroxyl functional components of the invention is through chain extension with a number of steps, followed by adding a carbamate group to a hydroxyl functional group on the chain extended compound by methods such as noted above. For example, to make carbamate functional resins of the invention, the core polyol, comprising the reaction product of polyisocyanate and amino functional polyol, may be reacted with a polycarboxylic acid or anhydride to form a carboxyl intermediate containing an ester linkage and a free carboxyl group.

Preferred as the polycarboxylic acid or anhydride are cyclic carboxylic anhydrides. Anhydrides are advantageous for this step because the ring-opening esterification is faster than reaction of remaining hydroxyl groups on the core polyol with the carboxyl group liberated by the ring opening reaction. As a consequence the carboxyl intermediate is a half acid ester with little polymerization or polyester formation.

Suitable anhydrides include, without limitation, anhydrides of dicarboxylic acids with carboxyl groups on adjacent carbons. The anhydrides can be aliphatic, cycloaliphatic, or aromatic. Examples include without limitation, maleic anhydride, succinic anhydride, phthlalic anhydride, hexahydrophthalic anhydride, tetrahydrophthalic anhydride, methyl tetrahydrophthalic anhydride, methylhexahydrophthalic anhydride, and trimellitic anhydride. Other anhydrides useful in the invention include, without limitation, adipic anhydride, glutaric anhydride, malonic anhydride, and the like.

The reaction of the polycarboxylic acid or anhydride with the core polyol results in formation of a first intermediate that has carboxyl functionality and may contain some primary or secondary hydroxyl groups that result from any unreacted hydroxyl groups on the core polyol.

The stoichiometry is chosen so that at least one primary hydroxyl group of the core polyol reacts with the polycarboxylic acid or anhydride. Preferably at least two hydroxyl groups on the core polyol will be reacted. In some embodiments the molar ratio of hydroxyl on the core polyol to carboxyl group on the polycarboxylic acid or anhydride will be selected so that essentially every hydroxyl group on the core polyol is esterified.

The first intermediate, which contains ester linkages, at least one carboxyl group and optionally has primary or secondary hydroxyl groups as noted above, is next reacted with a compound containing an epoxide group to form a second intermediate having a chain extension based on an epoxide-containing compound.

A wide variety of epoxide containing compounds may be used in the practice of the present invention. Epoxides are well-known in the art, and may be characterized by the general formula:

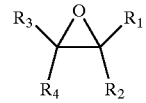

where $R_1$, $R_2$, $R_3$ and $R_4$ are each independently hydrogen (with the proviso that at least one of $R_1$–$R_4$ is other than hydrogen), an organic radical, which may be polymeric or non-polymeric and may contain unsaturation and/or heteroatoms, or one of $R_1$ or $R_2$ together with one of $R_3$ or $R_4$ may form a cyclic ring, which may contain unsaturation and/or heteroatoms.

Useful epoxides can be prepared from monofunctional alcohols, e.g., butanol and hexanol, by reaction with an epihalohydrin (e.g., epichlorohydrin) or by reaction of an allyl group with peroxide. For example, a monoepoxide can be prepared by reacting a mono-alcohol or mono-acid with an epihalohydrin or a monounsaturate with peroxide.

In one preferred embodiment, the epoxide is a monoepoxide preferably an epoxy ester, also known as a glycidyl ester. Glycidyl esters can be prepared by reacting a monofunctional carboxylic acid (e.g., octanoic acid, benzoic acid, benzylic acid, cyclohexane carboxylic acid) with an epihalohydrin (e.g., epichlorohydrin) under conditions well-known in the art. In a preferred embodiment, the monofunctional carboxylic used to produce the glycidy esters is a branched neo-acid such as, without limitation, neodecanoic or neononanoic acid. Glycidyl esters are commercially available, e.g., as Cardura® E from Shell Oil Company, Glydexx® N-10 from Exxon, or Araldite® PT910 from Ciba-Geigy. Glycidyl esters may be described by the formula:

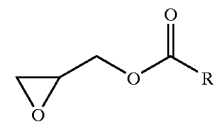

wherein R is a hydrocarbon group of from 1 to about 40 carbon atoms, preferably from about 1 to about 20 carbon atoms, and most preferably from about 1 to about 12 carbon atoms. This hydrocarbon group may be substituted, as is known in the art.

Another useful class of monoepoxides is glycidyl ethers. Glycidyl ethers can be prepared by the reaction of monofunctional alcohols (e.g., n-butanol, propanol, 2-ethylhexanol, dodecanol, phenol, cresol, cyclohexanol, benzyl alcohol) with an epihalohydrin (e.g., epichlorohydrin). Useful glycidyl ethers include the glycidyl ether of 2-ethylhexanol, the glycidyl ether of dodecanol, the glycidyl ether of phenol, and the like. These compounds are commercially available under the Erisys® product family from CVC Specialties.

The reaction of the epoxide compound with the carboxyl function core is preferably carried out without catalyst. In this case, the epoxide group of the epoxide-containing compound reacts faster with the carboxyl group than with any primary or secondary hydroxyl groups that may be present on the first intermediate. Therefore, a relatively clean chain extension is achieved to form a second intermediate that contains secondary hydroxyl groups resulting from ring opening of the epoxide, as well as any primary or secondary hydroxyl groups that remained unreacted in the formation of the first intermediate, above.

Preferably the epoxy containing compound is reacted in a molar ratio of about 1:1 with respect to carboxyl groups on the carboxyl functional core. However, if carboxyl groups are desired in the final product (for example for salting with amines to provide a water dispersible coating), an excess of carboxyl functional first intermediate may be used.

The next step in preparing the resin of the invention is to add carbamate groups to the second intermediate. As discussed above, the second intermediate contains at least secondary hydroxyl groups resulting from the ring opening of the epoxy containing compound. It may also contain primary or secondary hydroxyl groups on the core, if less than a molecular equivalent of polycarboxylic compound was used to react with the core polyol.

Alternatively, the hydroxyl or carbamate functional resins of the invention may be based on a hyperbranched polyol prepared from the hydroxyl functional component described above.

Hyperbranched polyols are prepared by the reaction of a first compound having two or more hydroxyl groups (here represented by the hydroxyl functional component) and a second compound having one carboxyl group and two or more hydroxyl groups. The first and second compounds can be reacted to form a first generation hyperbranched polyol. Alternatively, the second compound can be reacted with the first generation hyperbranched polyol to form a second generation and, if desired, subsequent generations. Preferably, a first generation or second generation hyperbranched polyol is used as the hyperbranched core of the carbamate-functional resin of the invention.

The second compound used to prepare the hyperbranched polyol can be a monofunctional carboxylic acid having at least two hydroxyl groups. Examples include, without limitation α,α-bis(hydroxymethyl)propionic acid (dimethylol propionic acid), α,α-bis(hydroxymethyl)butyric acid, α,α,α-tris(hydroxymethyl)acetic acid, α,α-bis(hydroxymethyl) valeric acid, α,α-bis(hydroxyethyl)propionic acid or α-phenylcarboxylic acids having at least two hydroxyl groups directly pendant to the phenyl ring (phenolic hydroxyl groups) such as 3,5-dihydroxybenzoic acid.

The hyperbranched polyols can be prepared by reacting the first compound and second compound under esterification conditions. The temperature of reaction is generally from 0 to 300° C., preferably 50 to 280° C., and most preferably 100 to 250° C.

A first generation intermediate is prepared by reacting the first compound and second compound in an equivalent molar ratio of hydroxyls on the first compound to carboxyl groups on the second compound of between about 1:2 and about 2:1. Preferably the equivalent ratio will be from about 1:1.5 to about 1.5:1, and even more preferably from about 1:1.2 to about 1.2:1.

The functionality and polydispersity of the first generation intermediate, and of any subsequent generation, depend on the equivalent ratio of hydroxyl groups to carboxyl groups of the reactants in each step. The functionality of the hyperbranched polyol, whether first generation or subsequent generation, should be four hydroxyl groups or greater. Hyperbranched polyols with a wide range of polydispersities are useful. It is preferred that the polydispersity be less than about 2.5, preferably less than about 2.0, and most preferably less than about 1.8

The hyperbranched hydroxyl functional components may be used in the coating compositions of the invention in combination with at least one other component that has functional groups reactive with hydroxyl groups. Alternatively, the hyperbranched polyol may be converted to a carbamate functional resin by any of the procedures described above.

In one aspect, the carbamate- or hydroxyl functional resins containing urea groups and made by the procedures described above, may be represented by the general formula

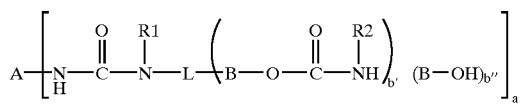

wherein A represents an organic radical; L is a linking group of one or more atoms exclusive of hydrogen; B is also a linking group of one or more atoms exclusive of hydrogen, and may be the same as or different from L; a is greater than or equal to 2 and the sum of b' and b" is 2 or greater; and R1 and R2 represent hydrogen, alkyl, aryl, substituted alkyl, or substituted aryl groups. When b' is zero, the formula represents hydroxyl functional resins. When the resin is either partially (b" greater than zero) or completely (b" equal to zero) substituted with carbamate groups.

In a preferred embodiment, a is 3 and the sum of b'+b" is also 3. This corresponds to the structure formed by reacting a triisocyanate compound with an amino polyol containing three hydroxyl groups followed by adding a carbamate group as described above. In a preferred embodiment, the linking groups L and B are both alkylene groups of about four carbons or fewer. In a particularly preferred embodiment, the linking groups L and B are both methylene groups. This represents a structure obtained from the reaction of a polyisocyanate compound with an aliphatic amino polyol, optionally followed by direct addition of a carbamate group to the resulting hydroxyl groups. In a particularly preferred embodiment, L and B are both methylene, a is 3 and the sum of b' and b" is 3.

Carbamate functional resins are prepared from hydroxyl functional resins of the invention by adding a carbamate group. Wherein all of the hydroxyl groups on the hydroxyl component are converted to carbamate groups, b" in the above general formula will be equal to 0. It is however, possible to prepare carbamate functional resins that are also partially hydroxyl functional. This will be reflected in the general formula when b" is greater than 0. In general, the relative carbamate and hydroxyl functionality of the resins can be optimized according to the desired properties of the coating compositions.

In another embodiment, the carbamate functional resins of the invention are prepared by chain extension of an initial polyol core as described above. In this situation, the linking group B in the general formula will represent the organic group formed by the chain extension or series of chain extension steps. For example, when the chain extension includes at least reaction of the polyol component with an anhydride or a dicarboxylic acid, the linking group B will contain at least ester linkages. In general, B represents any linking group resulting from chain extension such as the groups formed by sequential chain extension with dicarboxylic acid and epoxide group as discussed above.

High solids coating compositions can be prepared by combining the carbamate-functional resin (A) of the invention with a compound (B) containing a plurality of functional groups that are reactive with the carbamate groups on the carbamate-functional resin. Such reactive groups include siloxane, silane, and anhydride groups, as well as active alkylol or alkoxyalkyl groups on aminoplast crosslinking agents or on other compounds such as phenol/formaldehyde adducts.

Examples of compounds (B) include, without limitation, melamine formaldehyde resin including monomeric or polymeric melamine resin and partially or fully alkylated melamine resin, urea resins (e.g., methylol ureas such as urea formaldehyde resin and alkoxy ureas such as butylated urea formaldehyde resin), N-methylol acrylamide emulsions, isobutoxy methacrylamide emulsions, polyanhydrides (e.g., polysuccinic anhydride), and siloxanes or silanes (e.g., dimethyldimethoxy silane). Aminoplast resins such as melamine formaldehyde resin or urea formaldehyde resin are especially preferred. Also useful are aminoplast resins where one or more of the amino nitrogens is substituted with a carbamate group for use in a process with a curing temperature below 150° C., as described in U.S. Pat. No. 5,300,328.

Aminoplast resins useful as compound B in the coating compositions of the invention can be highly alkylated or partially alkylated amino resins formed by the reaction of an amine with an aldehyde. Preferred amino resins include those which are reaction products of amines such as urea or melamine with an aldehyde such as formaldehyde.

In another embodiment, the coating compositions of the invention can contain thermosettable resins other than the hydroxyl or carbamate resins of the invention and the second components described above. In a preferred embodiment, the compositions further comprise a carbamate-functional acrylic resin. Carbamate-functional resins are known in the art to be useful in clearcoat compositions. They include a plurality of carbamate functional groups on an acrylic backbone. The carbamate groups are introduced into the resin by transcarbamation of a hydroxyl-functional resin following polymerization of acrylic monomers, and can also be prepared from acrylic monomers containing carbamate functional groups. Such carbamate-functional acrylic resins are described, for example, in U.S. Pat. No. 5,605,965 to Rehfuss et al., the disclosure of which is hereby expressly incorporated by reference.

In this embodiment, the coating compositions of the invention may comprise two carbamate-functional resins and at least one compound containing a plurality of functional groups reactive with the carbamate groups. The carbamate-functional acrylic resin, if present, makes up from between about 5 and about 95% by weight of the total carbamate resin in the composition.

A solvent may optionally be utilized in the coating compositions used in the practice of the present invention. The coating composition according to the present invention can be applied without solvent. However, in many cases, it is desirable to use a solvent in the coating composition as well. This solvent should act as a solvent with respect to both the carbamate- or hydroxyl functional resin or resins as well as the component (B). In general, depending on the solubility characteristics of components (A) and (B), the solvent can be any organic solvent and/or water. In one preferred embodiment, the solvent is a polar organic solvent. More preferably, the solvent is a polar aliphatic solvent or polar aromatic solvent. Still more preferably, the solvent includes a ketone, ester, acetate, aprotic amide, aprotic sulfoxide, or aprotic amine. Examples of useful solvents include, without limitation, methyl ethyl ketone, methyl isobutyl ketone, amyl acetate, ethylene glycol butyl ether-acetate, propylene glycol monomethyl ether acetate, xylene, N-methylpyrrolidone, or blends of aromatic hydrocarbons. In another embodiment, the solvent can be water or a mixture of water with co-solvents.

The coating composition used in the practice of the invention may include a catalyst to enhance the cure reaction. For example, when aminoplast compounds, especially monomeric melamines, are used as component (B), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts.

Additional agents, for example surfactants, fillers, stabilizers, wetting agents, dispersing agents, adhesion promoters, UV absorbers, HALS, etc., may be incorporated into the coating composition. While the agents are well-known in the prior art, the amount used must be controlled to avoid adversely affecting the coating characteristics.

The compositions of the invention may be unpigmented, or they may further comprise any of a number of pigments well known in the art. Such pigments include inorganic pigments such as, without limitation, titanium dioxide and iron oxide, as well as organic pigments. Metallic pigments may also be used, as well as color effect pigments that appear to change hue when viewed from different angles. The pigment loading of compositions of the invention is selected according to techniques known in the art to provide a desired color effect in the coatings.

Coating compositions can be coated on the article by any of a number of techniques well-known in the art. These include, for example, spray coating, dip coating, roll coating, curtain coating, and the like. The coatings can be cured at about 200° F. to 350° F. for a period of about 10 to 60 minutes.

In one preferred embodiment, the coating composition according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80. In other preferred embodiments, the coating composition may be utilized to prepare high-gloss or low-gloss primer or enamel coatings.

When the coating composition according to the invention is used as the clearcoat of a composite color-plus-clear coating, the pigmented basecoat composition may be any of a number of types well-known in the art, and may be either solvent-based or waterborne. The clearcoat compositions may be applied wet-on-wet, or the basecoat may be cured before application of the clearcoat. In one aspect, clearcoats are applied over a conventional solvent based basecoat. Typical thicknesses for the basecoat is about 0.7 mils, while the clearcoat film builds are typically from about 1.8 to about 2.0 mils. After application, the coated substrates may be allowed to flash at ambient temperature for 10 minutes, then baked at an elevated temperature to cure. Typical curing conditions include baking in a gas fired convection oven for about 25 minutes at about 275° F. metal temperature.

In another aspect, the clearcoat compositions may be sprayed over a waterborne basecoat. The waterborne basecoats are generally sprayed onto a substrate such as a steel panel, and allowed to flash at relatively low temperatures for a short period of time to remove water. After the clearcoat is applied, the coating may be flashed for a short period of time at ambient temperature. Thereafter, the coating may be cured as described above.

Polymers known in the art to be useful in basecoat compositions include acrylics, vinyls, polyurethances, polycarbonates, polyesters, alkyds, and siloxanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of crosslinkable, functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functions groups.

Basecoat polymers may be self cross-linkable, or may require a separate cross-linking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional cross-linking agents.

The resins and coating compositions of the invention have been described above with respect to preferred embodiments. The following examples give further non-limiting descriptions of the resins of the inventions.

EXAMPLES

Example 1

Synthesis of Hydroxyl Functional Resin 78 g (0.4 moles) of the isocyanurate of hexymethalene isocyanate, 48.5 gram (0.4 moles) of tris(hydroxylmethyl) aminomethane, and 70 grams of butylcarbitol is weighed in a 3 liter flask. Initially, the reaction mixture is clear. As the tris(hydroxymethyl)aminomethane starts reacting, the mixture becomes foamy. The solid mixture is transferred to a pint container and diluted with 56 grams of butylcarbotol. The percent non-voltatile of the resulting solution is 50%. The resin preparation is taken up into solvent with a melamine crosslinking resin. The solvent containing composition is drawn down as a film on a phosphated steel plate. The film is cured for 30 minutes at 260° F. The cured film gives more than 200 MEK rubs.

Example 2

Synthesis of Hydroxyl Functional Resin from Isophorone Diisocyanate

The procedure of Example is carried out, except that 0.4 moles of the isocyanurate of isophorone diisocyanate is used in place of the hexymethalene diisocyanate isocyanurate. The resin preparation is taken up into solvent with a melamine crosslinking resin. The solvent containing composition is drawn down as a film on a phosphated steel plate. The film is cured for 30 minutes at 260° F. The cured film gives more than 200 MEK rubs.

I claim:

1. A coating composition comprising:
   (A) a hydroxyl functional component that is a urea reaction product of
      (1) a polyisocyanate having two or more isocyanate groups, and
      (2) a reactive compound having three hydroxyl groups and one amino group; and
   (B) a component comprising a plurality of groups that are reactive with the hydroxyl groups on the hydroxyl functional component.

2. A composition according to claim 1, wherein the polyisocyanate has three isocyanate groups.

3. A composition according to claim 1, wherein the polyisocyanate comprises an isocyanurate of a diisocyanate.

4. A composition according to claim 1, wherein the polyisocyanate comprises an isocyanurate of a diisocyanate selected from the group consisting of isophorone diisocyanate, hexamethylene diisocyanate, and combinations thereof, and the reactive compound comprises trimethylolaminomethane.

5. A composition according to claim 1, wherein Component (B) comprises blocked isocyanate.

6. A composition according to claim 1, further comprising water.

7. A composition according to claim 1, further comprising an organic solvent.

8. A composition according to claim 1, further comprising a pigment.

9. A carbamate or hydroxyl functional resin, comprising a composition of general formula

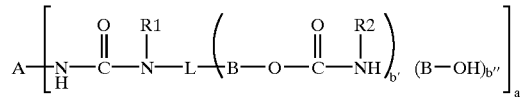

wherein
   A is an organic radical;
   L is a linking group of one or more atoms exclusive of hydrogen;
   B is a linking group of one or more atoms exclusive of hydrogen, and may be same as or different from L;
   a is greater than or equal to 2;
   b' and b" are greater than or equal to zero, and the sum of b' and b" is 2 or greater; and
   R1 and R2 are independently hydrogen or an alkyl, aryl, substituted alkyl, or substituted aryl group.

10. A resin according to claim 9, wherein b' is zero.

11. A resin according to claim 9, wherein b" is zero.

12. A carbamate functional resin according to claim 9, wherein a is 3 and the sum of b' and b" is 3.

13. A resin according to claim 9, wherein L and B are alkylene groups of four carbons or less.

14. A resin according to claim 9, wherein L and B are methylene.

15. A resin according to claim 14, wherein a is 3 and the sum of b' and b" is 3.

16. A resin according to claim 9, wherein B includes ester linkages.

17. A resin according to claim 16, made by a process comprising the steps of:
   reacting a polyisocyanate having two or more isocyanate groups with a reactive compound having one amino group and two or more hydroxyl groups to form a hydroxyl functional core;
   chain extending the hydroxyl functional core by reacting it with a carboxylic anhydride or dicarboxylic acid to form a carboxylic functional core;
   reacting the carboxyl functional core with an epoxy compound to produce a hydroxyl functional intermediate; and
   carbamoylating the hydroxyl functional intermediate.

18. A resin according to claim 17, wherein the polyisocyanate comprises an isocyanurate of a diisocyanate.

19. A resin according to claim 9, made by a process comprising the steps of:

reacting a polyisocyanate having two or more isocyanate groups with a reactive compound having one amino group and two or more hydroxyl groups to form a hydroxyl functional core; and carbamoylating the hydroxyl functional core.

20. A resin according to claim 19, wherein a is 3 and the sum of b' and b" is 3.

21. A resin according to claim 19, wherein the polyisocyanate comprises an isocyanurate of an organic diisocyanate.

22. A coating composition comprising:

a carbamate functional resin according to claim 9; and a component comprising a plurality of functional groups reactive with the carbamate groups on the carbamate functional resin.

23. A coating composition according to claim 22, further comprising a pigment.

24. A coating composition comprising:

a carbamate functional resin according to claim 19; and a component comprising a plurality of functional groups reactive with the carbamate groups on the carbamate functional resin.

25. A coating composition according to claim 24, further comprising a pigment.

26. A method for making a carbamate functional resin, comprising the step of adding a carbamate group to a hydroxyl functional core, wherein the core is a reaction product of a polyisocyanate having two or more isocyanate groups and a reactive compound having one amino group and two or more hydroxyl groups.

27. A method according to claim 26, wherein the polyisocyanate has three isocyanate groups and the reactive compound has three hydroxyl groups.

28. A method according to claim 26, wherein the polyisocyanate comprises an isocyanurate of an organic diisocyanate.

29. A method according to claim 26, wherein the step of adding a carbamate group comprises adding a carbamate group by transcarbamation.

30. A method according to claim 26, wherein the step of adding a carbamate group comprises reacting the hydroxyl functional core with a compound that contains an isocyanate group and a carbamate group.

31. A method according to claim 26, wherein the step of adding a carbamate group comprises the steps of:

chain extending the hydroxyl functional core with a carboxylic anhydride or dicarboxylic acid to form a carboxy functional core;

reacting the carboxy functional core with an epoxy compound to produce a hydroxyl functional intermediate; and carbamoylating the hydroxyl functional intermediate.

32. A method according to claim 31, wherein the carbamoylating step comprises adding a carbamate group by transcarbamation.

33. A method according to claim 31, wherein the carbamoylating step comprises reacting the hydroxyl functional intermediate with a compound that contains an isocyanate group and a carbamate group.

* * * * *